April 2, 1929.   W. W. WINSHIP   1,707,590
ELECTRICAL INSULATION
Filed July 28, 1924
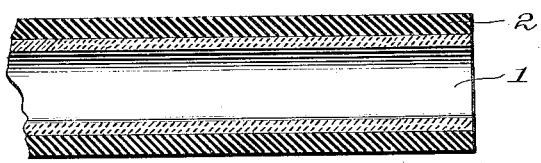
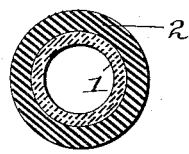
Inventor,
William W. Winship,
Attorneys.

Patented Apr. 2, 1929.

1,707,590

UNITED STATES PATENT OFFICE.

WILLIAM W. WINSHIP, OF FREEPORT, NEW YORK.

ELECTRICAL INSULATION.

Application filed July 28, 1924. Serial No. 728,744.

This invention pertains to an improved electrical insulation.

The main object of the invention is to produce a composite structure embodying a plurality of elements certain of which have a high dielectric efficiency and others a relatively high mechanical strength. Stated more specifically, the structure may be said to comprise two elements; one, such as fused silica or fused quartz, which is highly dielectric and which also has considerable electrical resistance at high temperatures and a small coefficient of expansion but which exhibits low mechanical strength under shock or jar; and a second member which contributes to the structure the necessary mechanical strength. Said second member will preferably be of a material possessing dielectric properties to a greater or less degree.

By way of illustration, two structures are shown in the accompanying drawings, in which, Fig. 1 is a longitudinal sectional view of a tubular insulation produced in accordance with my invention;

Fig. 2 is a transverse sectional view thereof;

Fig. 3 a view similar to Fig. 1 illustrating the fused elements in conjunction with a different type of covering; and Fig. 4 a transverse section thereof.

Referring first to Figs. 1 and 2, 1 denotes a tubular member produced from fused silica or quartz commonly known as vitreosil, silica glass, quartz glass, etc., which is surrounded by a covering of hard rubber denoted by 2.

Hard rubber when molded around the fused quartz or silica comes in close relation thereto and upon cooling doubtless shrinks to a certain extent so that the members are inseparable except if one or the other be broken. It is of course conceivable that within the broader aspect of the invention hard rubber may be secured to the fused silica or quartz element by a suitable cementitious material which in and of itself may exhibit dielectric properties, but I prefer to mold the element 2 directly upon the fused silica or quartz without the interposition of any medium.

In Figs. 3 and 4, there is shown a tubular member 3 formed from fused silica or quartz surrounded in this instance by a material other than hard rubber, such for instance as vulcanized or hard fibre. Such material is indicated by 4. The fibre member will be placed upon the silica element in a wet condition so that, when it shrinks, it will closely bind and adhere to the fused element, the two becoming practically inseparable.

It is conceivable that within the broader aspect of the invention, other materials than the hard rubber, and vulcanized or hard fibre, may be employed in conjunction with the fused silica or quartz element. Both the hard rubber and the vulcanized or hard fibre have electrical insulating properties, and besides this fact they present to the structure that mechanical strength which is necessary to a commercial use where the device is subject to jar or shock which would disrupt or break the silica or quartz, which has a low mechanical strength.

As will be readily appreciated the silica or quartz will readily break when subjected to jar or impact whereas the hard rubber or the vulcanized or hard fiber presents a member which will not be disrupted under such conditions. Moreover, by the use of the hard rubber or vulcanized fiber the same may be machined or threaded without difficulty so that various elements, made up as above specified, may be secured together. In fact, the layer which is associated with the silica may be conformed or worked so that it can be made to fit into a machine or electrical device.

Materials which may be employed in place of the rubber and fibre are, for instance, condensation products, molded mica compositions, and similar substances which possess insulating properties to a greater or less extent and are also resistant to chemical reactions.

It is to be understood that, in so far as the generic invention is concerned, the structure may take the form of a rod, plate, cylinder, or any similar required shape.

By combining fused silica or fused quartz with one or more of the materials named in an integral composite structure without the use of cementing or foreign materials, or the use of a substantial proportion of cement, it is possible to obtain a structure possessing in a high degree the valuable characteristics of fused silica or quartz and the other insulating material or materials employed, and comparatively free from the inherent limitations of any of the constituent materials.

While I have shown but two layers, it is of course conceivable and fully within the scope of my invention to employ any number of layers requisite to build up the desired or necessary structure, hence the use of alternating layers is intended to cover one or more layers each of the fused silica or fused quartz and the other strength giving or producing elements.

What I claim is:

As a new article of manufacture, an insulating structure comprising a body produced from fused silica and a covering shrunk thereon, said covering possessing greater strength against rupture under impact or jar than the fused silica.

In testimony whereof I have signed my name to this specification.

WILLIAM W. WINSHIP.